Figure 1:
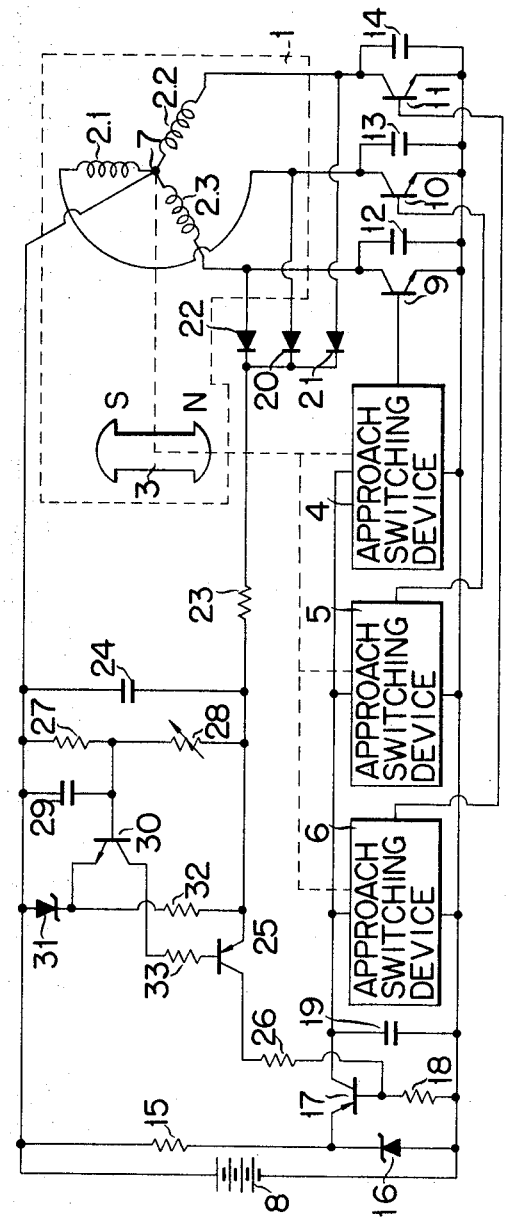

United States Patent

[11] 3,584,280

| [72] | Inventors | Junpei Inagaki;<br>Susumu Tadakuma, Yokohama-shi;<br>Shigeru Tanaka, Tokyo, all of, Japan |
|---|---|---|
| [21] | Appl. No. | 811,867 |
| [22] | Filed | Apr. 1, 1969 |
| [45] | Patented | June 8, 1971 |
| [73] | Assignee | Tokyo Shibaura Electric Co., Ltd.<br>Kawasaki-shi, Japan |
| [32] | Priority | Apr. 2, 1968, Apr. 6, 1968, June 18, 1968 |
| [33] |  | Japan |
| [31] |  | 43/21212, 43/23026 and 43/50869 |

[54] TRANSISTOR MOTOR APPARATUS INCLUDING CURENT ATTENUATION MEANS
5 Claims, 2 Drawing Figs.

[52] U.S. Cl. .................................................. 318/254,
                                                        318/138
[51] Int. Cl. ................................................ H02k 29/00
[50] Field of Search .................................... 318/138,
                                                 254, 439, 345

[56] References Cited
UNITED STATES PATENTS

| 3,200,315 | 8/1965 | Thompson | 318/138 |
| 3,274,471 | 9/1966 | Moczala | 318/254X |
| 3,304,481 | 2/1967 | Saussele | 318/138 |
| 3,329,852 | 7/1967 | Saussele et al. | 318/138 |
| 3,416,057 | 12/1968 | Froyd et al. | 318/138 |
| 3,440,506 | 4/1969 | Krestel et al. | 318/254X |
| 3,473,069 | 10/1969 | Herbert | 318/138 |

*Primary Examiner*—G. R. Simmons
*Attorney*—Flynn and Frishauf

ABSTRACT: This transistor motor apparatus comprises a current attenuating means for introducing a slowly attenuated current through the windings of a motor stator when there occurs the rapid cutoff of current through transistors disposed between a DC source and a plurality of stator windings wound on a multiphase belt of a DC motor in corresponding relationship to said stator windings, thereby protecting the transistors, and preventing the mechanical vibrations of a transistor motor caused by variations in its torque moment.

TRANSISTOR MOTOR APPARATUS INCLUDING CURENT ATTENUATION MEANS

The present invention relates to a transistor motor apparatus so improved as to prevent the mechanical vibrations of the transistor motor resulting from its varied torque moment due to the instant cutoff of the current through transistors involved.

As is well known, there is widely used a DC motor of a relatively small capacity driven by transistors instead of brushes, or what is called a transistor motor. The drive circuit of the transistor motor has transistors serially connected between the windings of the motor stator and the DC source. For example, with a motor provided with three-phase windings, there are serially connected three transistors to three stator windings respectively. The respective windings are supplied through the transistors with an electric current from the DC source for each electrical angle of 120° to rotate a motor rotor of a permanent magnet. However, the switching off of such transistors for subject of its 120° current applying is carried out by turning off the transistors so as to cut off power supply to the stator windings. In this case, the switching off of the transistors is completed in an extremely short time, causing an electric current supplied to the stator windings to assume a rectangular waveform at that moment and in consequence the torque moment applied to the rotor to vary also in a corresponding manner to said rectangular waveform. Accordingly, the motor is subject to mechanical vibrations. Such vibrations tend to appear prominently in a DC motor particularly having a relatively small capacity.

It is accordingly an object of the present invention to provide an inexpensive transistor motor apparatus of simple arrangement capable of effectively reducing the mechanical vibrations of the transistor motor resulting from its varied torque moment due to the instant cutoff of the current through transistors involved.

Another object of the present invention is to provide a transistor motor apparatus equipped with a protective circuit for the transistors used in driving said motor.

Still another object of the invention is to provide a transistor motor apparatus capable of carrying out its speed control accurately.

Figure 2:
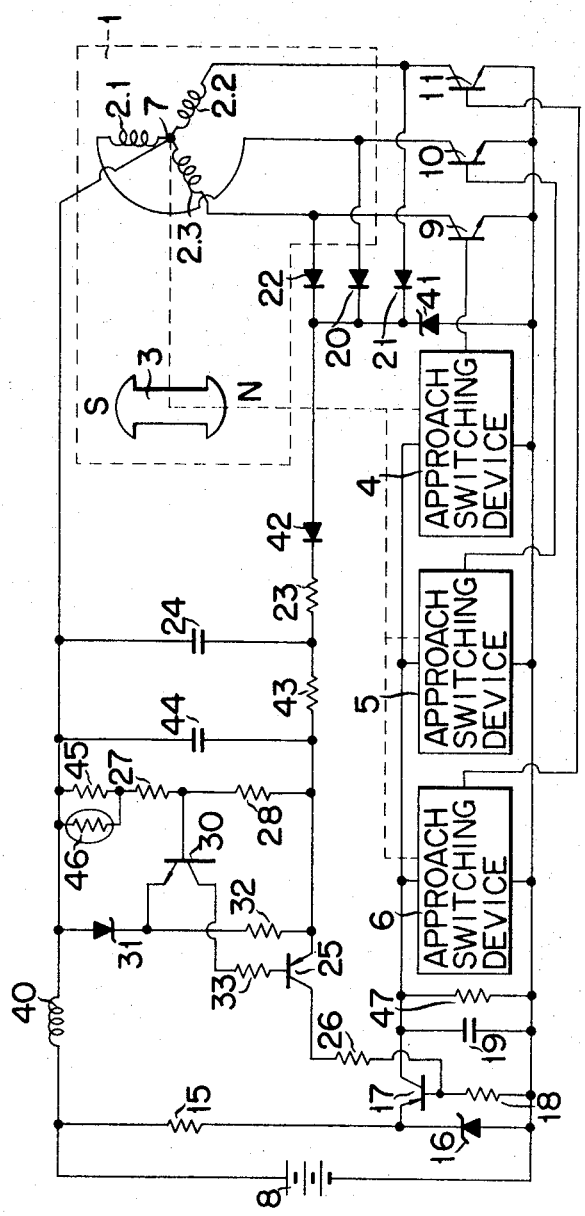

Other and further objects and advantages of the present invention will be apparent from the following description when taken in connection with the accompanying drawings, in which:

FIG. 1 is a circuit diagram of a transistor motor apparatus according to an embodiment of the present invention; and FIG. 2 is a circuit diagram of a transistor motor apparatus according to another embodiment of the invention.

There will now be described a transistor motor apparatus according to an embodiment of the present invention. Referring to FIG. 1, a DC motor 1 indicated by a broken line comprises a stator fitted with windings 2.1, 2.2 and 2.3 wound on a three-phase belt and a rotor 3, for example, of a dipole type, prepared from a permanent magnet. With the rotor 3 are mechanically coupled approach switching means 4, 5 and 6 as an element for detecting the rotating position of said rotor 3. The neutral point 7 among the three-phase windings 2.1, 2.2 and 2.3 is connected to the positive terminal of a DC source. The terminals of the three windings are connected to serially arranged transistors 9, 10 and 11 respectively and then jointly to the negative terminal of the DC source 8. To both ends of each of the transistors 9, 10 and 11 are connected condensers 12, 13 and 14 respectively in parallel relationship. The base regions of the transistors 9, 10 and 11 are impressed with output signals from the approach switching means 4, 5 and 6. To both ends of the DC source 8 is connected a constant voltage circuit consisting of a resistor 15 and a Zener diode 16. The output voltage from this constant voltage circuit is transferred from the contact of the resistor 15 with the Zener diode 16 to the approach switching means 4, 5 and 6 jointly through a charging and discharging circuit consisting of a transistor 17, resistor 18 and condenser 19. The other source terminals of the approach switching means 4, 5 and 6 are jointly connected to the negative terminal of the DC source 8.

The contacts of the stator windings 2.1, 2.2 and 2.3 with the transistors 9, 10 and 11 are shunted by three diodes 20, 21 and 22 respectively. The cathodes of the diodes 20, 21 and 22 are jointly connected to a smoothing circuit consisting of a resistor 23 and condenser 24. Outputs from the smoothing circuit are supplied to the contact of the base region of the transistor 17 with the resistor 18 through a transistor 25 and resistor 26. To both ends of the condenser 24 of the smoothing circuit is connected a voltage splitting circuit consisting of a resistor 27 and a variable resistor 28. The output voltage from the voltage splitting circuit is impressed on the base region of a transistor 30 through a condenser 29. To the emitter region of the transistor 30 is supplied a constant voltage from a constant voltage circuit consisting of a Zener diode 31 and a resistor 32. The collector region of said transistor 30 is connected to the base region of the transistor 25 through a resistor 33.

The aforesaid approach switching means 4, 5 and 6 constitute a circuit for detecting the rotating position of the rotor 3 and supplying signals to the base regions of the transistors 9, 10 and 11 so as to allow the rotor 3 to continue its rotation in accordance with the position thus detected and conduct and control these transistors in turn. There are already known various types of approach switching means intended to attain such object and detailed description thereof is omitted. To illustrate the arrangement of one of the approach switching means, there is disposed adjacent to the rotating locus of the magnetic pole of the motor rotor 9 magnetism sensitive element, for example, a magnetic semiconductor element. Outputs from said semiconductor element are supplied to an oscillator having a prescribed inductance capacity (This oscillator is hereinafter referred to as an LC oscillator.) for its actuation. The LC oscillator is further impressed with a drive voltage from the transistor 17. Outputs from the LC oscillator, for example, of 1 mHz. are positively fed back so as to render the rise-up or rise-down of said output signals sufficiently sharp, and, after being converted to DC signals, supplied to the base region of one of the motor-driving transistors 9, 10 and 11. The other two of the approach switching means are of the same arrangement as the first mentioned.

There will now be described the operation of the circuit of the transistor motor according to the present invention. Under normal operating condition, the rotor windings 2.1, 2.2 and 2.3 are supplied from the DC source 8 with driving power at a phase difference of 120° from each other through the transistors 9, 10 and 11 actuated by the approach switching means 4, 5 and 6 respectively in interlocking relationship with the rotor 3 so as to cause the rotor 3 to rotate at normal velocity. When the transistors 9, 10 and 11 are switched either way, the driving power supplied to the stator windings 2.1, 2.2 and 2.3 displays a sharp change in the rise-up or fall-down waveforms of signals. Particularly at the time of the fall-down, the resultant sudden stop of power supply causes a rapid current change in the stator windings 2.1, 2.2 and 2.3 in turn, eventually leading to variations in the torque moment applied to the rotor. Further, where the rotor 3 of the DC motor 1 rotates at a velocity exceeding a value previously set by the Zener diode 31 as later described, then there will appear a great inverse electromotive force in the stator windings 2.1, 2.2 and 2.3, causing the Zener diode 31 to be conducted by the output voltage from the smoothing circuit consisting of the resistor 23 and condenser 24, and consequently the transistors 30 and 25 to be also conducted in turn. Further, said output voltage from the smoothing circuit is impressed on the base region of the transistor 17 to turn it off. When this transistor 17 is turned off, the power source of the LC oscillator, for example, is cut off to prevent the approach switching means 4, 5 and 6 from issuing their outputs and in consequence turn off all the driving transistors 9, 10 and 11.

When these transistors 9, 10 and 11 are rendered unconducted by their alternate switching during normal operation or at the time of speed control, there appears in the stator windings 2.1, 2.2 and 2.3 an impact voltage having a spike-shaped waveform due to a sudden stop of power supply to the driving circuit. Such voltage is effectively absorbed in the condensers 12, 13 and 14 connected parallel to the transistors 9, 10 and 11. Since said impact voltage is not impressed on the speed detecting circuit consisting of the transistors 30 and 25, speed control can always be carried out accurately, thus preventing the transistors 9, 10 and 11 from being damaged by said impact voltage. Further, since an electric current to charge the condensers 12, 13 and 14 still continues to flow through the stator windings 2.1, 2.2 and 2.3 for a while after the cutoff of the transistors 9, 10 and 11, the mechanical vibrations of the transistor motor 1 due to variations in the torque moment can be avoided particularly effectively.

There will now be described the embodiment of FIG. 2. However, the same parts of FIG. 2 as those of FIG. 1 are denoted by the same numerals and description thereof is omitted.

To explain the arrangement of FIG. 2, there is serially connected a reactor 40 between the neutral point 7 among the stator windings 2.1, 2.2 and 2.3 of the DC motor 1 and the positive terminal of the DC source 8. Between the common contact of the cathodes of the diodes 20, 21 and 22 and the negative terminal of the DC source 8 is connected a Zener diode 41. Further between the common contact of the cathodes of the diodes 20, 21 and 22 and the resistor 23 is disposed a diode 42 in the forward direction. To the smoothing circuit consisting of the resistor 23 and condenser 24 is connected another smoothing circuit comprising a resistor 43 and condenser 44. To the voltage splitting circuit consisting of the resistors 27 and 28 is serially connected a resistor 45, and to said resistor 45 is connected in parallel relationship a thermistor 46 to be used in compensation for ambient temperatures. Further to the condenser 19 disposed between the transistor 17 and approach switching means 4, 5 and 6 is connected a resistor 47 in parallel relationship.

There will now be described the operation of the embodiment of FIG. 2. Where the rotor 3 of the DC motor 1 rotates at a velocity equal or lower than that set by the Zener diode 31, then there will be reduced an inverse electromotive force generated in the stator windings 2.1, 2.2 and 2.3, so that the transistors 30 and 25 will remain unconducted. Accordingly, there will flow an electric current from the transistor 17 to the approach switching means 4, 5 and 6, causing the transistors 9, 10 and 11 to be conducted at an electrical angle of 120° from each other. At this time, there occur variations in the torque moment for the same reason as given in the embodiment of FIG. 1. Under such condition the rotor 3 rotates at an elevated velocity and the inverse electromotive force from the stator windings increases in magnitude. A voltage resulting from this inverse electromotive force is supplied through the diode 42 to the aforementioned two smoothing circuits and then to a voltage splitting circuit including the thermistor 46.

At this time the Zener diode 31 is actuated to allow the transistors 30 and 25 to be conducted in turn as in the embodiment of FIG. 1, and the transistor 17 to be turned off. While the turnoff of this transistor 17 cuts off power supply to the approach switching means 4, 5 and 6, the energy stored in the condenser 19 is discharged through the resistor 47, causing the approach switching means 4, 5 and 6 continuously to issue signals to the transistors 9, 10 and 11 for a while even after the cutoff of the transistor 17, so that the transistors 9, 10 and 11 are prevented from being turned off suddenly. Further, after the turnoff of the transistors 9, 10 and 11, the electromagnetic energy accumulated in the reactor 40 runs for a while through the stator windings 2.1, 2.2 and 2.3, diodes 20, 21 and 22 and Zener diode 41. Accordingly, also in the embodiment of FIG. 2, an electric current flowing through the stator windings 2.1, 2.2 and 2.3 is prevented from being cut off all at once, effectively relieving the transistor motor of mechanical vibrations caused by variations in its torque moment.

What we claim is:

1. A transistorized motor apparatus comprising:
   a motor having a plurality of stator windings and a permanent magnet rotor;
   a source of DC potential;
   a plurality of driving transistors each serially connected between the DC source and a respective stator winding;
   approach switching means disposed in interlocking relationship with the permanent magnet rotor of the motor, said approach switching means issuing signals in accordance with the rotating position of the rotor to cause the driving transistors to be sequentially operated; and
   means to gradually attenuate the electric current flowing through the stator windings associated with said driving transistors when the signals from said approach switching means cause said driving transistors to be nonconducting, thereby preventing mechanical vibrations of the motor.

2. Apparatus according to claim 1 wherein said attenuation means includes a plurality of condensers, each being connected parallel to a respective driving transistor.

3. Apparatus according to claim 1 wherein said attenuating means includes a reactor serially connected to said DC source and a Zener diode selectively bypassing the electric current flowing through all of said driving transistors.

4. Apparatus according to claim 1 comprising a speed control means which includes means for detecting inverse electromotive forces generated in the stator windings and for smoothing out these forces, means for comparing the output voltage from said smoothing means with a predetermined value of voltage and varying the power supplied from the DC source to the approach switching means in accordance with said comparison.

5. Apparatus according to claim 1 wherein the approach switching means has a charging and discharging circuit which includes of a condenser and resistor connected parallel to the source circuit.